United States Patent
Pun et al.

(10) Patent No.: US 10,261,574 B2
(45) Date of Patent: Apr. 16, 2019

(54) REAL-TIME DETECTION SYSTEM FOR PARKED VEHICLES

(71) Applicant: University of Macau, Macau (CN)

(72) Inventors: Chi-Man Pun, Macau (CN); Cong Lin, Macau (CN)

(73) Assignee: UNIVERSITY OF MACAU, Macau (CN)

( * ) Notice: Subject to any disclaimer, the term of this patent is extended or adjusted under 35 U.S.C. 154(b) by 166 days.

(21) Appl. No.: 15/364,838

(22) Filed: Nov. 30, 2016

(65) Prior Publication Data

US 2018/0151063 A1    May 31, 2018

(51) Int. Cl.
| | |
|---|---|
| *G06F 3/00* | (2006.01) |
| *G06K 9/00* | (2006.01) |
| *G06T 7/00* | (2017.01) |
| *G08G 1/01* | (2006.01) |
| *G08G 1/04* | (2006.01) |
| *G08G 1/017* | (2006.01) |

(52) U.S. Cl.
CPC ............ *G06F 3/00* (2013.01); *G06K 9/00785* (2013.01); *G06T 7/00* (2013.01); *G08G 1/0116* (2013.01); *G08G 1/0133* (2013.01); *G08G 1/0175* (2013.01); *G08G 1/04* (2013.01); *G06K 9/00825* (2013.01)

(58) Field of Classification Search
CPC ...... G08G 1/017; G08G 1/04; G06K 9/00785; G06T 2207/30236
USPC .......................................................... 382/104
See application file for complete search history.

(56) References Cited

PUBLICATIONS

"A review of Computer Vision Techniques for the Analysis of Urban Traffic", Norbert Buch, IEEE Transactions on Intelligent Transportation Systems, vol. 12, No. 3, Sep. 2011, p. 920-939. (Year: 2011).*
J. Shawe-Taylor, T. De Bie, N. Cristianini, Data mining, data fusion and information management, Intelligent Transport Systems, IEE Proceedings, Sep. 2006, vol. 153, Issue 3, pp. 221-229.
J.C. Miles, A.J. Walker, The potential application of artificial intelligence in transport, Intelligent Transport Systems, IEE Proceedings, Sep. 2006, vol. 153, Issue 3, pp. 183-198.
X. Jiaolong, D. Vazquez, A.M. Lopez, J. Marin, D. Ponsa, Learning a part-based pedestrian detector in a virtual world, IEEE Transactions on Intelligent Transportation Systems, Apr. 9, 2014, vol. 15, Issue 5, pp. 2121-2131.

(Continued)

*Primary Examiner* — Brenda C Bernardi
(74) *Attorney, Agent, or Firm* — Bacon & Thomas, PLLC

(57) ABSTRACT

The present invention discloses a real-time detection system based on hybrid background modeling for detecting parked vehicles along the side of a road. The hybrid background model consists of three components: 1) a scene background model, 2) a computed restricted area map, and 3) a dynamic threshold curve for vehicles. By exploiting the motion information of normal activity in the scene, we propose a hybrid background model that determines the location of the road, estimates the roadside and generates the adaptive threshold of the vehicle size. The system triggers a notification when a large vehicle-like foreground object has been stationary for more than a pre-set number of video frames (or time). The present invention is tested on the AVSS 2007 PV dataset. The results are satisfactory compared to other state-of-the-art methods.

9 Claims, 12 Drawing Sheets

(56) References Cited

PUBLICATIONS

C. Minkyu, L. Wonju, Y. Changyong, P. Mignon, Vision-based vehicle detection system with consideration of the detecting location, IEEE Transactions on Intelligent Transportation Systems, Apr. 3, 2012, vol. 13, Issue 3, pp. 1243-1252.

D. Topfer, J. Spehr, J. Effertz, C. Stiller, Efficient road scene understanding for intelligent vehicles using compositional hierarchical models, IEEE Transactions on Intelligent Transportation Systems, Oct. 2, 2014, vol. 16, Issue 1, pp. 441-451.

J. Greenhalgh, M. Mirmehdi, Recognizing text-based traffic signs, IEEE Transactions on Intelligent Transportation Systems, Dec. 8, 2014, vol. 16, Issue 3, pp. 1360-1369.

P. Kumar, R. Surendra, W. Huang, K. Sengupta, Framework for real-time behavior interpretation from traffic video, IEEE Transactions on Intelligent Transportation Systems, Mar. 2005, vol. 6, Issure 1, pp. 43-53.

A. Raghavan, L. Juan, B. Saha, R. Price, Reference image-independent fault detection in transportation camera systems for nighttime scenes, 15th International IEEE Conference on Intelligent Transportation Systems (ITSC), Sep. 19, 2012, pp. 963-968.

S. Lei, J. Fan, S. Zhongke, R. Molina, A.K. Katsaggelos, Toward dynamic scene understanding by hierarchical motion pattern mining, IEEE Transactions on Intelligent Transportation Systems, Feb. 20, 2014, vol. 15, Issue 3, pp. 1273-1285.

Z. Wei, Q.M.J. Wu, W. Guanghui, Y. Xinge, Tracking and pairing vehicle headlight in night scenes, IEEE Transactions on Intelligent Transportation Systems, Sep. 10, 2011, vol. 13, Issue 1, pp. 140-153.

Z. Hailing, K. Hui, W. Lei, D. Creighton, S. Nahavandi, Efficient road detection and tracking for unmanned aerial vehicle, IEEE Transactions on Intelligent Transportation Systems, Jul. 9, 2014, vol. 16, Issue 1, pp. 297-309.

J.T. Lee, M.S. Ryoo, M. Riley, J.K. Aggarwal, Real-time detection of illegally parked vehicles using 1-D transformation, IEEE Conference on Advanced Video and Signal Based Surveillance, Sep. 7, 2007, pp. 254-259.

S. Boragno, B. Boghossian, J. Black, D. Makris, S. Velastin, A DSP-based system for the detection of vehicles parked in prohibited areas, IEEE Conference on Advanced Video and Signal Based Surveillance, Sep. 7, 2007, pp. 260-265.

P.L. Venetianer, Z. Zhang, W. Yin, A.J. Lipton, Stationary target detection using the object video surveillance system, IEEE Conference on Advanced Video and Signal Based Surveillance, Sep. 7, 2007, pp. 242-247.

S. Guler, J.A. Silverstein, I.H. Pushee, Stationary objects in multiple object tracking, IEEE Conference on Advanced Video and Signal Based Surveillance, Sep. 7, 2007, pp. 248-253.

S. Huwer, H. Niemann, Adaptive change detection for real-time surveillance applications, Visual Surveillance, Proceedings, Third IEEE International Workshop on, Jul. 1, 2000, pp. 37-46.

L. Liyuan, H. Weimin, I.Y.H. Gu, T. Qi, Statistical modeling of complex backgrounds for foreground object detection, IEEE Transaction on Image Processing, Nov. 2004, vol. 13, pp. 1459-1472.

M. Piccardi, Background subtraction techniques: a review, IEEE International Conference on Systems, Man and Cybernetics, Oct. 13, 2004, vol. 4, pp. 3099-3104.

C. Stauffer, W.E.L. Grimson, Adaptive background mixture models for real-time tracking, IEEE Computer Society Conference on Computer Vision and Pattern Recognition, Jun. 25, 1999, vol. 2, p. 252.

T. Ying-Li, L. Max, A. Hampapur, Robust and efficient foreground analysis for real-time video surveillance, IEEE Computer Society Conference on Computer Vision and Pattern Recognition, Jun. 25, 2005, vol. 1, pp. 1182-1187.

F. Quanfu, S. Pankanti, L. Brown, Long-term object tracking for parked vehicle detection, 11th IEEE International Conference on Advanced Video and Signal Based Surveillance, Aug. 29, 2014, pp. 223-229.

B.K. Horn, B.G. Schunck, Determining optical flow, Technical Symposium East, Aug. 1981, pp. 185-203.

P. Anandan, A computational framework and an algorithm for the measurement of visual motion, International Journal of Computer Vision, Jan. 1989, vol. 2, Issue 3, pp. 283-310.

J.R. Bergen, P. Anandan, K.J. Hanna, R. Hingorani, Hierarchical model-based motion estimation, European Conference on Computer Vision, May 22, 1992, pp. 237-252.

T. Brox, C. Bregler, J. Malik, Large displacement optical flow, IEEE Conference on Computer Vision and Pattern Recognition, Jun. 25, 2009, pp. 41-48.

C. Liu, Beyond Pixels: Exploring New Representations and Applications for Motion Analysis, Doctoral Thesis, May 2009, Massachusetts Institute of Technology.

Y. Cheng, Mean shift, mode seeking, and clustering, IEEE Transactions on Pattern Analysis and Machine Intelligence, Aug. 1995, vol. 17, Issue 8, pp. 790-799.

K.-C. Toh, S. Yun, An accelerated proximal gradient algorithm for nuclear norm regularized linear least squares problems, Pacific Journal of Optimization, Sep. 2010, vol. 6, p. 15.

A. Beck, M. Teboulle, A fast iterative shrinkage-thresholding algorithm for linear inverse problems, SIAM J. Imag. Sci., Mar. 4, 2009, vol. 2, pp. 183-202.

S. Boyd, N. Parikh, E. Chu, B. Peleato, J. Eckstein, Distributed optimization and statistical learning via the alternating direction method of multipliers, Foundations and Trends in Machine Learning, Jan. 2011, vol. 3, Issue 1, pp. 1-122.

X. Yuan, J. Yang, Sparse and Low-rank Matrix Decomposition via Alternating Direction Methods, the Optimization Online, Jan. 2009.

Z. Lin, M. Chen, Y. Ma, The Augmented Lagrange Multiplier Method for Exact Recovery of Corrupted Low-rank Matrices, Technical Report, Oct. 2009, University of Illinois at Urbana-Champaign.

E.J. Candes, X. Li, Y. Ma, J. Wright, Robust principal component analysis, Journal of the ACM, May 2011, vol. 58, Issue 3, pp. 1-37.

J.T. Lee, M.S. Ryoo, M. Riley, J.K. Aggarwal, Real-time illegal parking detection in outdoor environments using 1-D transformation, IEEE Transactions on Circuits and Systems for Video Technology, Apr. 7, 2009, vol. 19, Issue 7, pp. 1014-1024.

C.-M. Pun and C. Lin, A real-time detector for parked vehicles based on hybrid background modeling, Journal of Visual Communication and Image Representation, May 19, 2016, vol. 39, pp. 82-92.

\* cited by examiner

REAL-TIME DETECTION SYSTEM FOR PARKED VEHICLES

BACKGROUND OF THE INVENTION

1. Field of the Invention

The present invention relates to a real-time detection system, especially relates to a real-time detection system based on hybrid background modeling for detecting parked vehicles along the side of a road.

2. Description of the Prior Art

Because demands in many aspects of intelligent transportation systems have increased in recent years, many surveillance cameras have become installed along roads, for instance, on foot bridges, adjacent to traffic lights, in parking areas and on vehicles. Certain intelligent traffic surveillance systems in the literature employ computer vision or data mining techniques (J. Shawe-Taylor, T. De Bie, and N. Cristianini, "Data mining, data fusion and information management," 2006) (J. C. Miles and A. J. Walker, "The potential application of artificial intelligence in transport," 2006) to process data acquired from these cameras and to solve various automation problems in transportation. On the one hand, some applications (X. Jiaolong, D. Vazquez, A. M. Lopez, J. Marin, and D. Ponsa, "Learning a Part-Based Pedestrian Detector in a Virtual World," 2014) (C. Minkyu, L. Wonju, Y. Changyong, and P. Mignon, "Vision-Based Vehicle Detection System With Consideration of the Detecting Location," 2012) (D. Toper, J. Spehr, J. Effertz. and C. Stiller, "Efficient Road Scene Understanding for Intelligent Vehicles Using Compositional Hierarchical Models," 2015) (J. Greenhalgh and M. Mirmehdi, "Recognizing Text-Based Traffic Signs," 2015) take advantage of these techniques to obtain knowledge about the surroundings, e.g., pedestrians (Jiaolong et al.), vehicles (Minkyu et al.), lanes (Topfer et al.) and traffic signs (Greenhalgh et al.), using in-vehicle cameras. These methods can potentially assist drivers by presenting scene information, issuing early warnings and even automatically preventing traffic accidents. On the other hand, many cameras have been installed outside vehicles to monitor the transportation status from a broader prospective. The captured video data are semantically analyzed patterns for determining traffic (P. Kumar, R. Surendra, W. Huang, and K. Sengupta. "Framework for real-time behavior interpretation from traffic video," 2005) (A. Raghavan, L. Juan, B. Saha, and R. Price, "Reference image-independent fault detection in transportation camera systems for nighttime scenes," 2012) or road conditions (S. Lei, J. Fan, S. Zhongke, R. Molina, and A. K. Katsaggelos, "Toward Dynamic Scene Understanding by Hierarchical Motion Pattern Mining," 2014) (Z. Wei, Q. M. J. Wu, W. Guanghui, and Y. Xinge, "Tracking and Pairing Vehicle Headlight in Night Scenes," 2012) (Z. Hailing, K. Hui, W. Lei, D. Creighton, and S. Nahavandi, "Efficient Road Detection and Tracking for Unmanned Aerial Vehicle," 2015) using computer-vision-based methods.

Vehicles parked along the side of a road represent an important problem in traffic surveillance. Parking a vehicle on the side of a main road can slow down traffic streams, block the sight of following vehicles and even lead to traffic accidents. As digital cameras become cheaper and increasingly more surveillance cameras are installed for law enforcement on roads, it has become easier to observe a parked vehicle. However, manually observing these surveillance video remains laborious and costly. A real-time intelligent parked vehicle detection system can help address this problem. Many parked vehicle detectors (L. Jong Taek, M. S. Ryoo, M. Riley, and J. K. Aggarwal, "Real-time detection of illegally parked vehicles using 1-D transformation," 2007) (S. Boragno, B. Boghossian, J. Black, D. Makris, and S. Velastin. "A DSP-based system for the detection of vehicles parked in prohibited areas," 2007) (P. L. Venetianer, Z. Zhang, W. Yin, and A. J. Lipton, "Stationary target detection using the object video surveillance system," 2007) (S. Guler, J. A. Silverstein, and I. H. Pushee, "Stationary objects in multiple object tracking," 2007) (S. Huwer and H. Niemann, "Adaptive change detection for real-time surveillance applications," 2000) (L. Liyuan, H. Weimin, I. Y. H. Gu, and T. Qi, "Statistical modeling of complex backgrounds for foreground object detection," 2004) (M. Piccardi, "Background subtraction techniques: a review," 2004) (C. Stauffer and W. E. L. Grimson, "Adaptive background mixture models for real-time tracking," 1999) have been proposed in recent decades. Most methods employ fixed cameras and are based on background subtraction methods (Huwer et al.) (Liyuan et al.) (Piccardi) (Stauffer et al.). Generally, background-subtraction-based methods construct a background model off-line using initialization frames, and the background model subtracts the input frames during detection by assuming that the foreground objects lie in the differences. Then, a foreground analysis, e.g., (T. Ying-Li, L. Max, and A. Hampapur, "Robust and efficient foreground analysis for real-time video surveillance," 2005), is conducted on the subtracted differences to determine the objects of interest. This framework has been proposed for more than a decade and has been found to be effective in traffic surveillance. However, inevitably, there have been some drawbacks to the conventional background subtraction method (Liyuan et al.) (Piccardi). Arguably, the most serious problem is that the subtracted foreground (difference) usually contains substantial noise due to the scene background model and noise from cameras. Moreover, the background of real-world settings may change in an outdoor scene as a result of various complicated factors, e.g., changes in illumination and new stationary foreground objects. These factors are likely to introduce noise into the foreground mask. Many parked vehicle detectors that are based of background subtraction attempt to overcome these drawbacks. Taek et al. proposed the detection of parked vehicles in a 1-D data domain. The video frames are first transformed into a 1-D vector. Both the background subtraction and the foreground analysis are conducted in the 1-D domain. Once the event is detected, the detector transforms the 1-D data back into the original video frame and locates the parked vehicles. Boragno et al. integrated a sophisticated Digital Signal Processor (DSP) to handle the input frames, and a stationary detection filter was designed with constraints applied to stationary objects. Venetianer et al. first grouped the foreground pixels into blobs and filtered the blobs based on calibrated size. Then, the blobs are tracked and subsequently used to generate tempo-spatial objects. Objects are classified by purpose of application. For parked vehicle detection, the vehicles are identified and recorded at a stationary time. S. Guler et al employed a multiple-object tracker to determine the location of each vehicle in a scene after obtaining the foreground mask from the background subtraction. Although certain methods (Boragno et al.) (Venetianer et al.) (Guler et al.) require users to manually draw the restricted area for the foreground analysis, others (Taek et al.) (F. Quanfu, S. Pankanti, and L. Brown, "Long-term object tracking for parked vehicle detection," 2014) do not specify the restricted area in the scene for detection. Thus, the detection is equally weighted across the scene in the background subtraction stage, and it is likely that the stationary objects in the unrelated area will trigger false-positive alarms. This might be improved using a more sophisticated foreground analysis method or even pre-trained model. However, real-time performance is crippled by more complicated operations and corresponding higher computational costs.

SUMMARY OF THE INVENTION

In view of the deficiencies of the prior-art techniques, the object of the present invention is to provide a real-time detection system for parked vehicles so as to provide a straightforward and highly efficient detection system in real time.

According the one object of the present invention, provides an offline hybrid background modeling system for online detection, comprising: a processor; a memory device communicatively coupled with the processor; and a non-transitory storage medium including an application configured for execution by the processor that when executed, enables the processor to: load initialization frames and stack each frame into a 1-D sample vector; form an observation matrix using sample vectors and set a balancing coefficient; solve a low-rank representation and output a low-rank matrix; and obtain a row-wise median values of an estimated low-rank matrix and reshape it into the matrix.

According to one aspect of the present invention, the general form of the low-rank representation is $$\min_{L,E}(\|L\|_* + \lambda\|E\|_0)$$
$$\text{s.t. } X = L + E.$$

According to another aspect of the present invention, the balancing coefficient $\lambda$ is set to 0.1.

According to another aspect of the present invention, the processor solved the low-rank representation by using augmented Lagrange multiplier method.

According the another object of the present invention, provides a real-time detection system for parked vehicles, comprising: a processor; a memory device communicatively coupled with the processor; and a non-transitory storage medium including an application configured for execution by the processor that when executed, enables the processor to: set a stationary matrix $S_0=0$ and receive a number of frames entered by a user; perform a background subtraction on frame i and compute foreground object labels by using a precomputed restricted area map, wherein i is a natural number; update a stationary matrix $S_i$ for obtaining $\overline{S}_i$ by thresholding a stationary criteria; extract connected components from $\overline{S}_i$ as candidates, and computer centroids and average widths of the candidates; compute adaptive thresholds using y coordinates of the candidates' centroids; and determine if detections have occurred, send a notification to output devices.

According to one aspect of the present invention, the stationary matrix is two dimensional.

According to another aspect of the present invention, the processor updates the stationary matrix $S_i$ by using $$S_i = \{s_i(h,w)\}_{H\times W} = \begin{cases} s_i(h,w) = s_{i-1}(h,w) + 1, & \text{if } a(h,w) = 1 \\ s_i(h,w) = 0, & \text{otherwise} \end{cases}$$

According to another aspect of the present invention, the processor precomputed the restricted area by following steps: loading initialization frames and computing motion information of every two consecutive frames; performing mean shift clustering on motion information matrices, extracting moving objects and outputting foreground moving object masks; accumulating the motion matrices and outputting a motion map; and transforming the motion map by using difference of sigmoid functions.

According to another aspect of the present invention, the foreground moving object masks are obtained by using $$Mask_{foreground} = \{a(h,w)\}_{H\times W} = \begin{cases} a(h,w) = 1, & \text{if } (h,w) \in location(C_{foreground}) \\ a(h,w) = 0, & \text{otherwise} \end{cases}$$

According to another aspect of the present invention, the difference of sigmoid functions is $$dsigmf(x,[a1\ c1\ a2\ c2]) = \frac{1}{1+e^{-a1(x-c1)}} - \frac{1}{1+e^{-a2(x-c2)}},$$

wherein x is an element in the motion map; a1 and a2 control the left slope and right slope of the bell shape, respectively, and c1 and c2 control where the stiffs should begin on the left- and right-hand side, respectively.

In view of the above, the present invention may have one or more of the following advantages:

1. The present invention can automatically generate roads and restricted area along the roads.

2. The present invention is straightforward and highly efficient in real time due to off-line initialization computation.

3. The present invention can reduce the probability of occurrence on false alarm and computational costs as well.

BRIEF DESCRIPTION OF THE DRAWINGS

In the following, the invention will be described in greater detail by means of preferred embodiments and with reference to the attached drawings, in which.

DETAILED DESCRIPTION OF THE PREFERRED EMBODIMENT

In present application, a real-time detection system for parked vehicles along the side of a road is proposed. The main idea of the present application is that the system can determine where the road is and how large the vehicles are by exploiting the motion information of normal activity in the scene; in addition, the system can further estimate the roadside and the adaptive thresholds for the vehicles. Compared to conventional parked vehicle detectors, the proposed system is capable of automatically generating the road and the restricted area along it. After the weight map of the restricted area is obtained, the system can apply it to the background subtraction process and generate a substantially clearer foreground mask that is capable of automatically ruling out unrelated foreground objects. Moreover, during initialization, the vehicle size is regressed onto a function curve that outputs adaptive thresholds for a vehicle with respect to the Y-axis. The system triggers a notification when a large vehicle-like foreground object has been stationary for more than a pre-set number of video frames (or time). Because most of the computation is performed during the off-line initialization, the proposed system is straightforward and highly efficient in real time.

I. Proposed Detection System for Parked Vehicles Using Hybrid Background Modeling Detection Methods that estimate the dynamic status of objects with fixed cameras can be divided into two classes: object-tracking-based methods (Venetianer et al.) (Guler et al.) (Quanfu et al.) and background-subtraction-based methods. The former methods employ object tracking methods to locate moving objects across frames. Most of these tracking methods construct a generative model for all the vehicles and perform tracking via a detection scheme. After detecting the vehicles, the trajectories are analyzed, and the system determines whether they are moving or stationary. There are certain disadvantages to object-tracking-based methods. First, a sophisticated vehicle detector that learns almost all types of vehicles from the real world, which is a difficult task considering the wide-ranging variance of shapes, colors and textures of vehicles, must be used. Second, false-positive detections of vehicles will result in irreversible false parked vehicle notifications. Finally, when the numbers of tracked objects in the scene increasing, the computational cost will increase, which leads to unstable performance and decreased efficiency.

Figure 1:
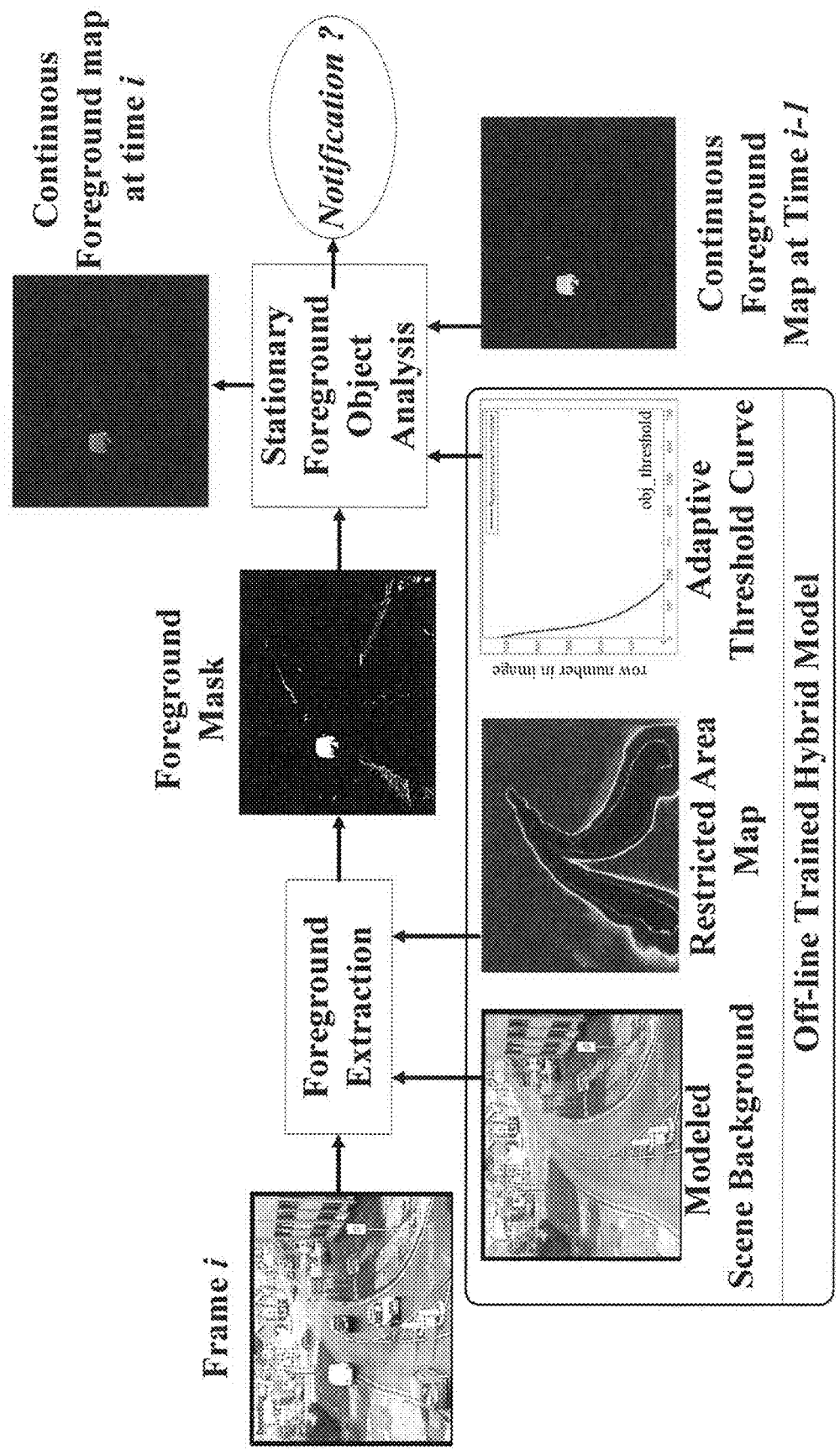
FIG. 1 illustrates a workflow of proposed real-time detection system for parked vehicles using hybrid background modeling.
Figure 2:
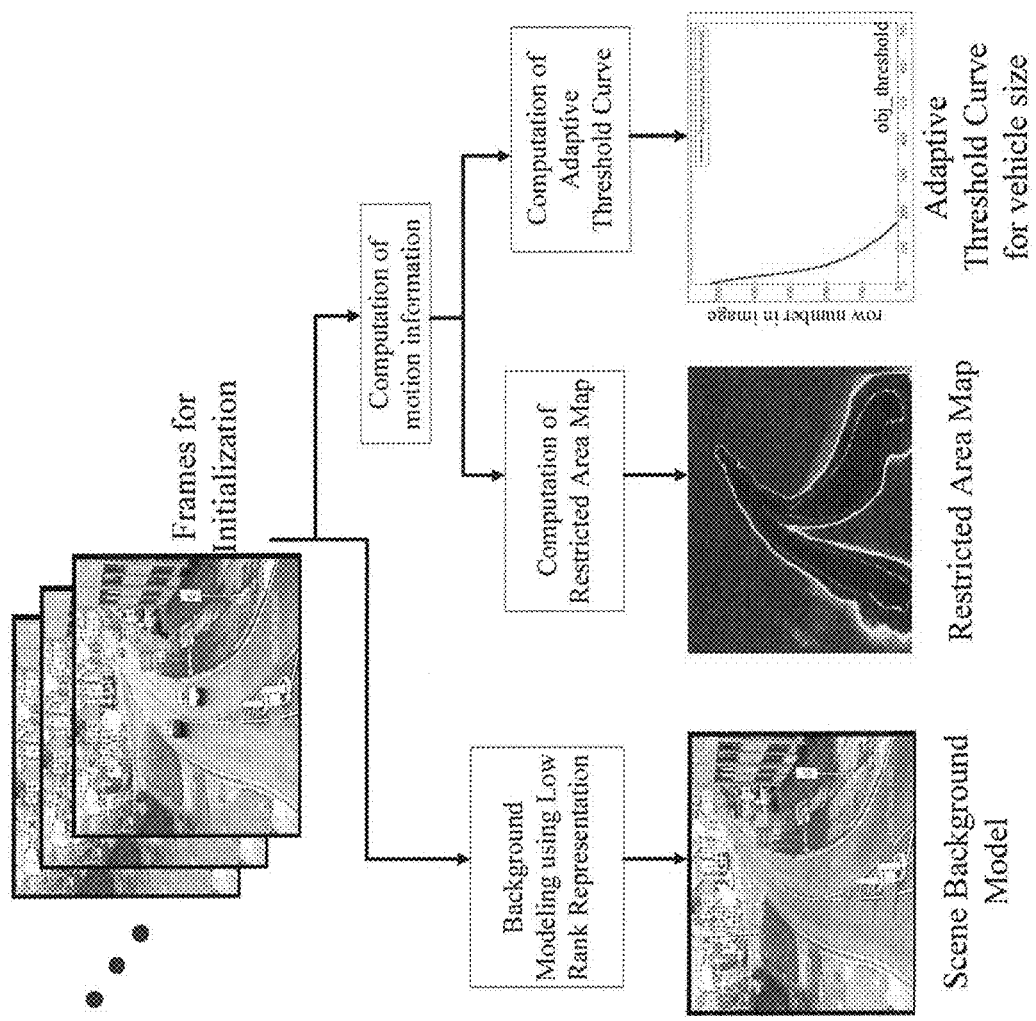
FIG. 2 illustrates a scheme of off-line initialization of hybrid background model.

Because surveillance cameras are typically fixed, an improved background-subtraction-based method is a reasonable option. The underlying concept of background subtraction is to detect pixels in the new frame that are different from the prior information of the initialization frames or the background image. However, in contrast to conventional background subtraction methods that merely model the background using initialization video frames, the proposed method can further extract the motion information from the initialization frames and transform the accumulated motion information into a restricted area map that indicates different weights for detection in the captured scene. FIG. 1 shows the workflow of the proposed detection system during online detection, and FIG. 2 shows that the trained hybrid background model is extracted in the initialization stage. A hybrid background model is constructed prior to on-line detection, which includes the following three components: 1) a scene background is modeled by a variant of the low-rank method, 2) a restricted area map is extracted from the motion information, and 3) a dynamic threshold curve for vehicles is regressed using the motion information.

I-I Online Detection Using Hybrid Background Model

Figure 3:
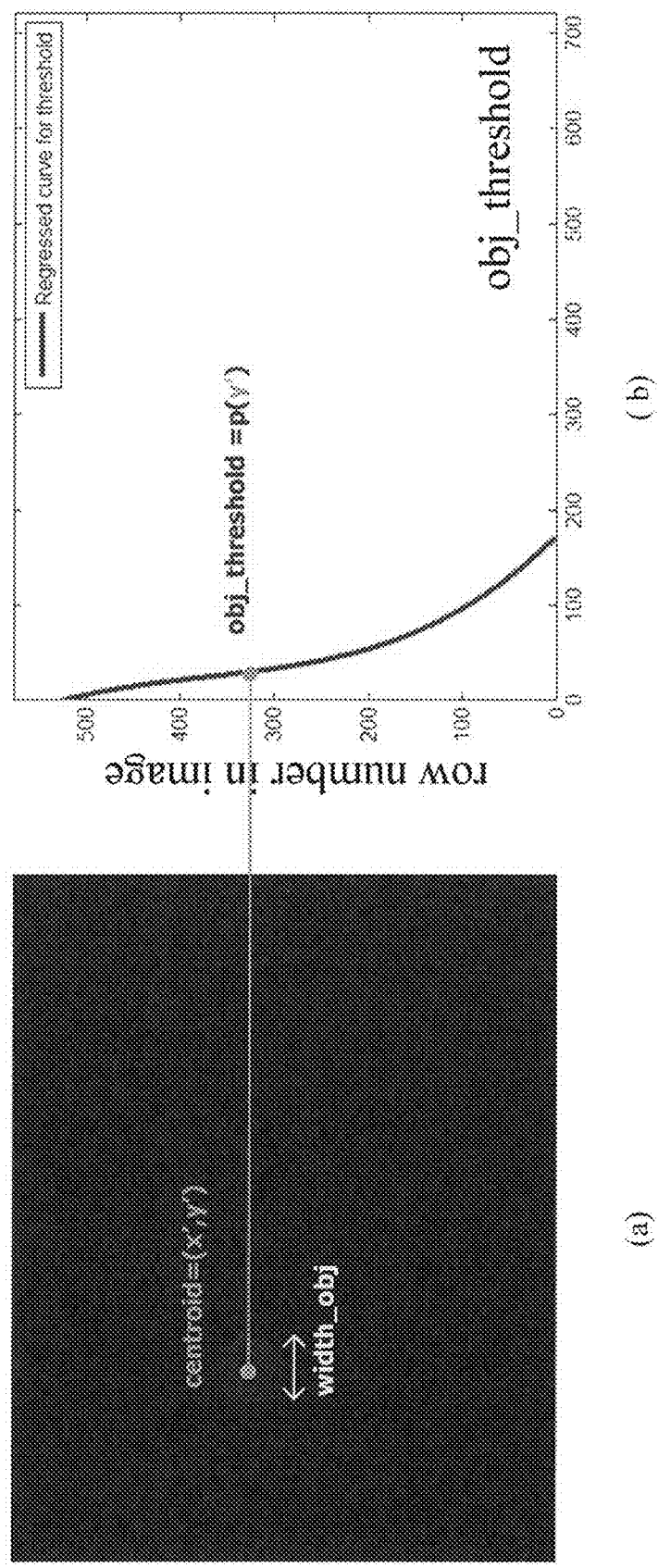
FIG. 3 illustrates measuring a candidate stationary object using an adaptive threshold: (a) the location and average width of the candidate object is extracted from a stationary object label; (b) generating an adaptive threshold using the regressed curve and measuring.

Assuming that the hybrid background model is obtained, as proposed and explained in the next section, the online parked vehicle detection technique employs the hybrid background model to extract foreground objects in the restricted area. Then, we proceed to determine the stationary objects and whether there is any detection. To search for stationary objects, we must know how long the objects have been stationary. To record how long a pixel has been in foreground objects, we propose that the detector maintains a two-dimensional stationary matrix S, whose elements count how long (based on the number of frames) the corresponding pixels are covered by the foreground object. The stationary matrix is initialized as a matrix of zeroes. For clarity, we explain the workflow in FIG. 1 with the following procedures:

Algorithm 1: Real-Time Detection Using Hybrid Background Model
Initialize: stationary matrix $S_0=0$, stationary criterion (number of frames).
For frame i=1 to end frame
    Step 1: Perform background subtraction on frame i and compute foreground object labels using restricted area map.
    Step 2: Update stationary matrix $S_i$ using equation (1).
    Step 3: Obtain $\overline{S}_i$ by thresholding the stationary criteria.
    Step 4: Extract connected components from $\overline{S}_i$ as candidates. In addition, compute their centroids and average widths.
    Step 5: Compute adaptive thresholds using the y coordinates of the candidates' centroids. In addition, determine if any detections have occurred.
End After initialization and the setting of the stationary criteria by the user, we enter a loop of online detection. In Step 1, when a new frame at time i is acquired from the camera and input into the foreground extraction stage of the detector, the frame is first subtracted by the modeled background and simultaneously multiplied by the pre-computed map of the restricted area. The differences of each pixel are in the form of a three-elemental vector, from which RGB channels are generated. The differences are pixel-wisely measured by the $L_2$ norm. The output is a foreground mask $Mask_{foreground}$, which marks the foreground objects in the current frame. The following steps represent the stationary foreground object analysis stage in FIG. 1. In Step 2, the stationary matrix $S_i$ at time i is computed using the extracted foreground mask and the stationary matrix $S_{i-1}$ of the previous time i−1. After the foreground mask is computed from the incoming frame i, the matrix is updated as follows:

$$S_i = \{s_i(h,w)\}_{H \times W} = \begin{cases} s_i(h,w) = s_{i-1}(h,w) + 1, & \text{if } a(h,w) = 1 \\ s_i(h,w) = 0, & \text{otherwise} \end{cases} \quad \text{equation (1)}$$

where $\{a(h,w)\}_{H \times W} = \text{Mask}_{foreground}$. If a pixel is in the foreground, the corresponding element in the stationary matrix S, which acts as a counter, is incremented by 1. Otherwise, the element is reset to 0. Therefore, the intensity in the stationary matrix S reflects the time that the object labels have been stationary. In Step 3, a stationary object label $\overline{S}$ is segmented based on the preset number of frames (in the user's stationary criterion) from the stationary matrix. Each element bears a Boolean value, which indicates that its corresponding pixel is confirmed to be stationary in the pre-set criterion. A pre-set stationary criterion of time for parked vehicles thresholds the stationary at time i. In Step 4, the foreground object analysis is performed on this stationary object label $\overline{S}$ when label pixels are found. Next, the candidate stationary objects, including their centroids ($x_q'$, $y_q'$), q=1, 2, . . . , Q, are sampled from the stationary object label $\overline{S}$ as units of connected components. For each candidate stationary object, we measure their average width $\overline{w}_q$. In Step 5, the segmented stationary objects are measured by the adaptive threshold for the vehicles, and thus, the detector determines whether the notification should be triggered. If the average width $\overline{w}_q$ of a candidate object, whose centroid is (x',y'), is larger than its adaptive threshold $f(y', \overline{p})$, which is retrieved from the regressed adaptive threshold curve, the notification is triggered, and the candidate is located as a parked vehicle. FIG. 3 illustrates how to measure a candidate stationary object using adaptive thresholds.

II. Offline Trained Hybrid Background Model for Online Detection

II-I. Modeling a Scene Background Using Low-Rank Representation

To ensure real-time performance, using the offline modeled background of the scene and background subtraction represents the basic step in our proposed method. Clearly, over a period of time, the background of a fixed scene remains stable, and most regions do not change dramatically. A robust scene background modeled by the median of a low-rank representation using the initialization frames is explained in this section. The low-rank representation can eliminate outlier noise in a sequence of similar signals. In our case, we consider that the latent backgrounds in each initialization frame are similar signals to be obtained. The general form of the low-rank representation is given as follows:

$$\min_{L,E}(\|L\|_* + \lambda\|E\|_0) \quad \text{equation (2)}$$
$$\text{s.t. } X = L + E$$

where λ is the balancing coefficient, L is the low-rank matrix, and E is a sparse matrix. Assuming that each pixel in the scene background model in the form of the image is the most stable over a period of time, we extract the scene background image given a set of initialization frames. Details are given in the following.

Algorithm 2: Modeling Scene Background Using Low-Rank Representation

Step 1: Load initialization frames and stack each frame into a 1-D sample vector. Step 2: Form an observation matrix using sample vectors. Set the balancing coefficient. Step 3: Solve equation (2) using an optimization method (E. J. Cand, X. Li, Y. Ma, and J. Wright, "Robust principal component analysis?") and output the low-rank matrix. Step 4: Obtain the row-wise median values of the estimated low-rank matrix and reshape it into the matrix.

Figure 4:
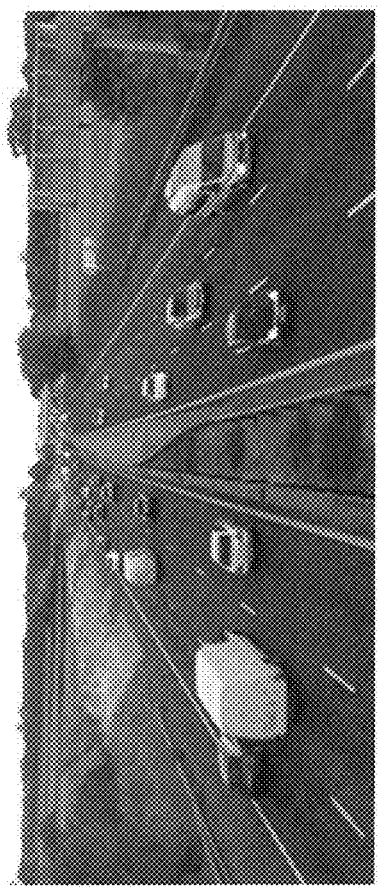
FIG. 4 illustrates a modeled background from a surveillance video clip: (a) snapshot from the video with busy and non-stop traffic; (b) the modeled background from the video clip.
Figure 4:
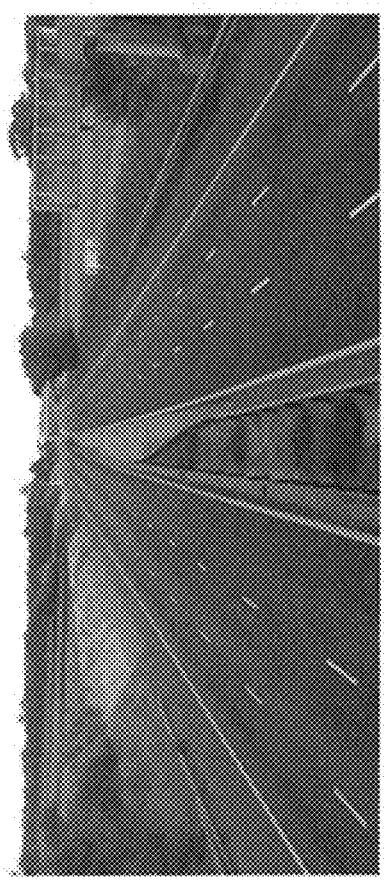

In Step 1, given K frames $\{f_i, i=1, 2, \ldots , K\}$ for initialization, each input video frame is in the form of an M*N*3 matrix. Each frame is stacked into a column vector $\{x_i, i=1, 2, \ldots , K\}$ by traversing elements in the order of row, column and color channel. In Step 2, we prepare the data needed in equation (2). All these vectors further form an observation matrix $X=[x_1, x_2, \ldots , x_K]$, and the balancing coefficient λ is set to 0.1. In Step 3, equation (2) is solved using optimization methods found in the literature, e.g., (K.-C. Toh and S. Yun, "An accelerated proximal gradient algorithm for nuclear norm regularized linear least squares problems") (A. Beck and M. Teboulle, "A fast iterative shrinkage-thresholding algorithm for linear inverse problems," 2009) (S. Boyd, N. Parikh, E. Chu, B. Peleato, and J. Eckstein, "Distributed optimization and statistical learning via the alternating direction method of multipliers") (X. Yuan and J. Yang, "Sparse and low-rank matrix decomposition via alternating direction methods", 2009) (Z. Lin, M. Chen, L. Wu, and Y. Ma, "The augmented Lagrange multiplier method for exact recovery of corrupted low-rank matrices.", 2009) (Cand et al.). Note that equation (2) cannot be solved directly. Assuming that other optimization methods are equally functional, the objective function is first converted into $$\min_{L,E}(\|L\|_* + \lambda\|E\|_1);$$

then, we employ augmented Lagrange multiplier method (ALM) (Lin et al.) (Cand et al.) to solve this problem. Cand et al. reviewed several the-state-of-art solutions for the same problem and pointed out that ALM of Cand et al. recovers the low-rank matrix more accurately with efficiency and stability. The ALM is an extension of Lagrange multiplier method in matrix space, which is a conventional method in optimization. The detailed solving process is given in Cand et al. The outputs are E and L. E is a sparse matrix that contains noise, which is trivial at this stage. $L=[l_1, l_2, \ldots , l_K]$ is the low-rank matrix whose column vectors $\{l_i\}$, i=1, 2 . . . , K are latent backgrounds in the initialization frames. Each row of L contains either the similar values or the mid-gray value of 128, where the corresponding elements in the observation matrix X are outliers. In Step 4, we reason that the most stable values of the column vectors are the medians. A median vector $ml_{[M*N*3,1]}$ is column-wise computed as $ml=\{ml_j=\text{median}(L_{(j,1)}, L_{(j,2)}, \ldots , L_{(j,K)})\}$, which alternatively means that the most stable pixel is picked up over a period of time in latent backgrounds. The median vector $ml_{[M*N*3,1]}$ is reshaped back into an M*N*3 matrix, which represents the modeled scene background. FIG. 4 presents the results of an example. The initialization frames include non-stop traffic, in which there are always many vehicles traveling along the highway, as in FIG. 4 a). The extracted scene background, shown in FIG. 4 b), is very clear and is not affected by outliers based on visual inspection.

II-II. Computation of Restricted Area Map Using Motion Information

In this subsection, a method of automatically generating the restricted area map using motion information is proposed. Although the processing speed for background-subtraction-based methods is high, the noised segmented foreground represents a serious problem. Illumination changes or other activities in the background may result in large numbers of false foreground segments in the difference found during the subtraction process. Therefore, if the detector focuses on the restricted area and filters out other unrelated regions, the computational cost of the later stage of the foreground analysis can be significantly reduced, and the rate of false-positive detection can be lowered as well. In this case, the restricted area is the side of the road.

Figure 5:
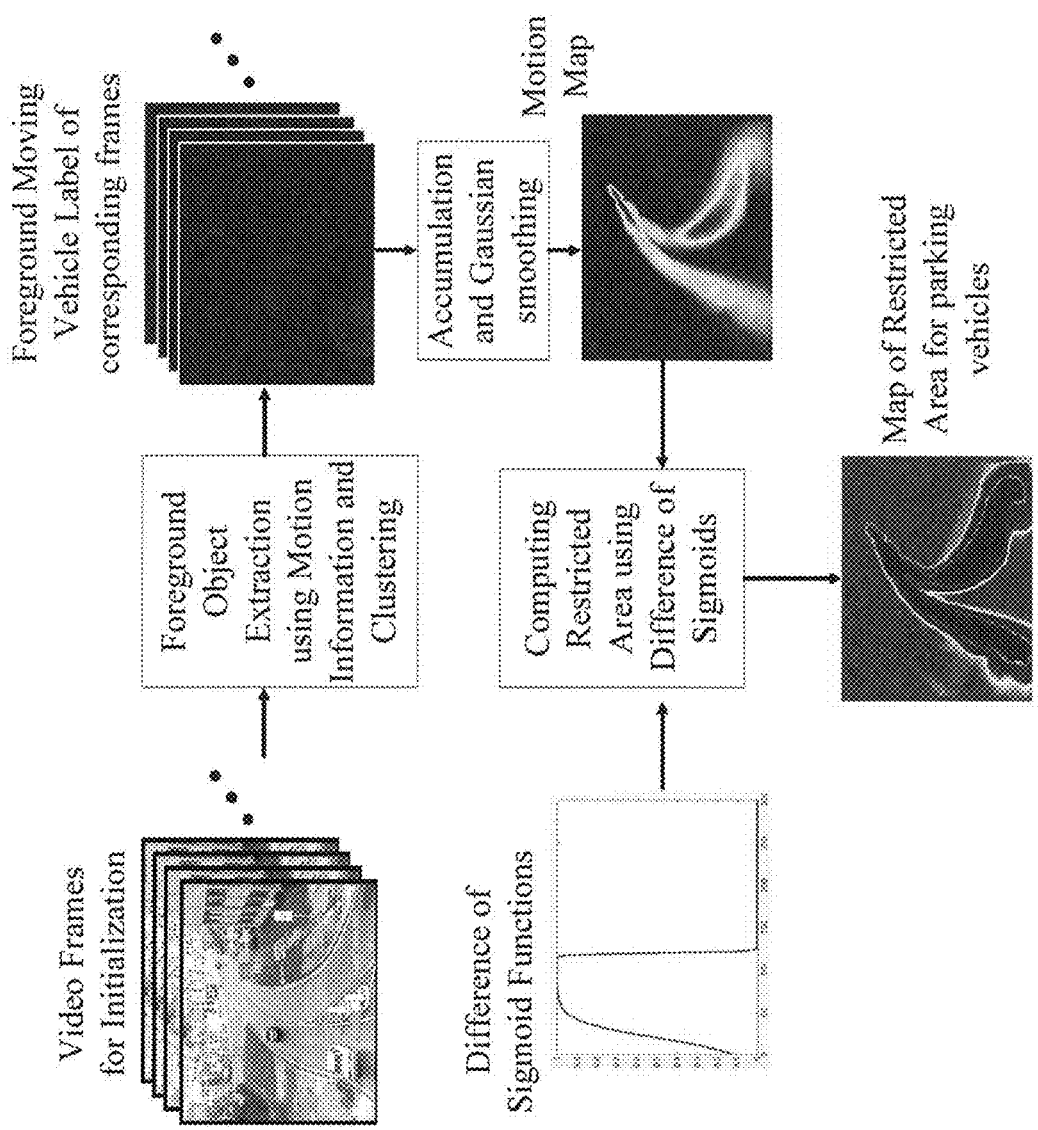
FIG. 5 illustrates a computation of restricted area maps for parked vehicles.

Because most surveillance cameras capture the same scenes most of the time (even though some can rotate over a short period of time), we assume that the normal traffic activities are mostly consistent. The vehicles are traveling in the same direction on the road. By observing and accumulating the motion stream, we can estimate where the road is within the captured scene. Furthermore, by soft segmenting the transition area between the most dynamic area (the road) and the static area (off the road), the road side or restricted area for parking a vehicle can be obtained. The computation of the map of the restricted area is illustrated in FIG. 5 and is detailed step by step in the following.

Algorithm 3: Computation of Restricted Area Map
Step 1: Load initialization frames and compute motion information of every two consecutive frames.
Step 2: Perform mean shift clustering on motion information matrices, extract moving objects and output foreground moving object masks.
Step 3: Accumulate the motion matrices and output a motion map.
Step 4: Transform the motion map using difference of sigmoid functions.

Figure 6:
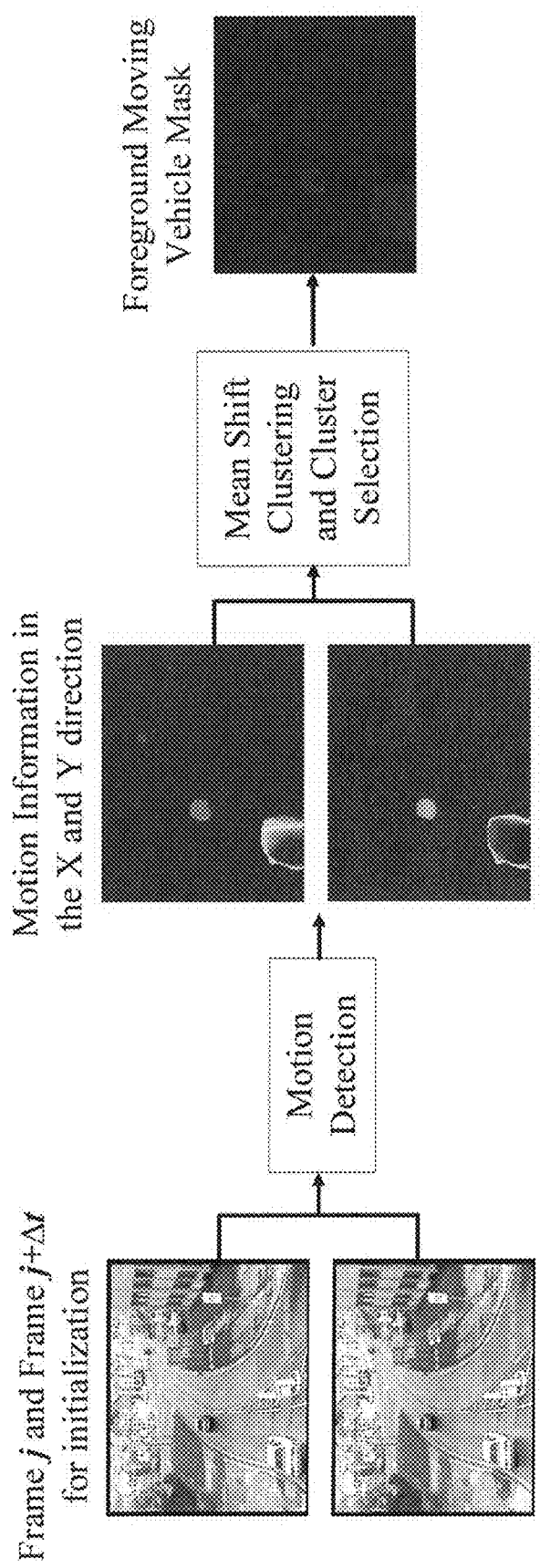
FIG. 6 illustrates an extraction of moving objects.

In Step 1, given a set of consecutive video frames for initialization that contain normal traffic activities, foreground moving vehicle labels are computed for every pair of consecutive frames. A more specific workflow of the computation of the moving objects in a pair of consecutive frames is shown in FIG. 6. Using the optical flow method (B. K. Horn and B. G. Schunck, "Determining optical flow," 1981) (P. Anandan, "A computational framework and an algorithm for the measurement of visual motion," 1989) (J. R. Bergen, P. Anandan, K. J. Hanna, and R. Hingorani, "Hierarchical model-based motion estimation," 1992) (T. Brox, C. Bregler, and J. Malik, "Large displacement optical flow," 2009) (C. Liu, "Beyond Pixels: Exploring New Representations and Applications for Motion Analysis," 2009), the moving pixels are obtained in the form of a motion matrix. The motion matrix contains two-dimensional displacement vectors, which represent the estimated motion of the corresponding pixels in the X and Y direction. From the output motion matrices, it is clear that pixels within moving objects mostly have their own moving directions and velocities.

Figure 7:
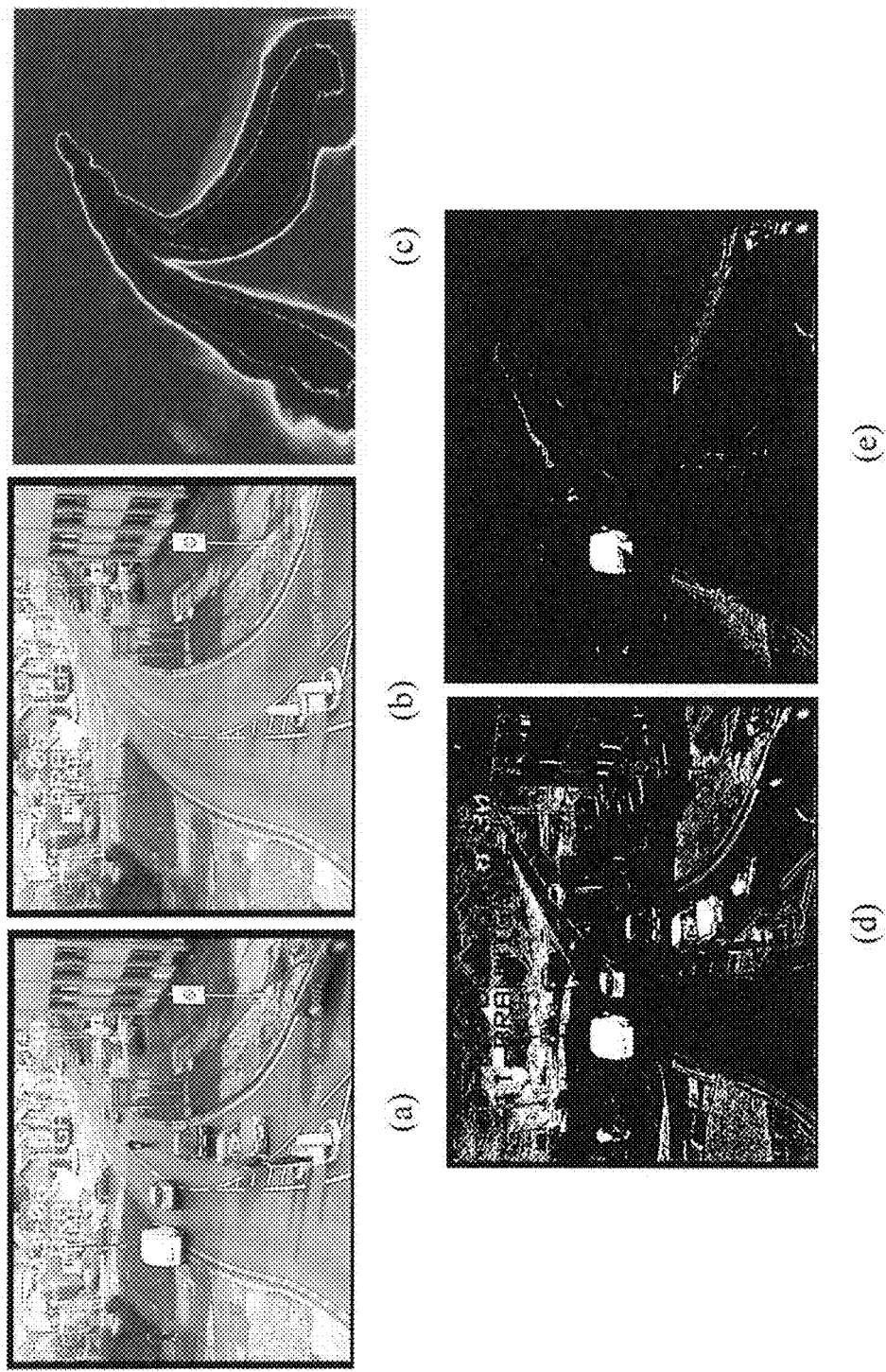
FIG. 7 illustrates a comparison of outputs from the proposed foreground extraction and the conventional background subtraction: (a) ordinary frame from a video; (b) modeled scene background; (c) initialized restricted area map; (d) output mask from conventional background subtraction. (e) output mask from the proposed foreground extraction.

In Step 2, the moving objects are gathered and output in moving object masks. Because an outdoor surveillance camera can be shaken by strong winds or road trembling, the background is not absolutely static, and all pixels could subsequently move. These turbulences in the video can result in noise in the motion. Thus, we cannot simply apply a hard thresholding with a zero vector [0,0] to segment the moving objects. To avoid noise and obtain moving objects as segments, the two-dimensional motion vectors are grouped into a set of clusters $C=\{c_1, c_2, \ldots, c_R\}$, R=num(foreground_obj)+1 using a radius-based mean shift (Y. Cheng, "Mean shift, mode seeking, and clustering," 1995) clustering method by assuming pixels in the same moving object are moving in similar directions and with velocities. num(·) calculates the number of foreground objects or moving objects. Because the number of moving vehicles is not fixed and is unknown in the video, we avoid using clustering methods whose parameters are specified by the number of clusters such as GMM or K-means. Empirically, the background always consists of the largest part of the captured scene; thus, it is natural that the cluster with the most members is of the relative static area (motions in the X and Y direction are close to the zero vector [0,0]). To obtain the mask of foreground moving vehicles, the cluster of the less dynamic area is first calculated as $$c_0 = \max_{r=1}^{R}(N(c_r)),$$

where N(·) represents the number of members within a cluster. The cluster of the background is removed by $C_{foreground}=C-\{c_0\}$, and the foreground mask is obtained as follows:

$$Mask_{foreground} = \{a(h,w)\}_{H \times W} = \begin{cases} a(h,w) = 1, \text{if } (h,w) \in \text{location}(C_{foreground}) \\ a(h,w) = 0, \text{otherwise} \end{cases} \quad (3)$$

where location(·) computes the location of members of clusters. In Step 3, for all the video frames provided for initialization, all the labels of moving vehicles of every two consecutive frames are accumulated to form a motion map. The motion map not only reveals the traffic trends but also provides cues about where the road is in the scene. Note that one may argue that this foreground extraction could be employed to segment the vehicles so that parked vehicles could be detected by subsequent analysis. However, the foreground object segmentations by motion are generally pixel-based or small-patch-based heuristic methods. These methods are computationally too costly to implement in real-time applications. In Step 4, because we have the cues of where the road lies, the map of the restricted area for parking vehicles is generated by transforming the dynamic map using the difference of sigmoid functions. The difference of sigmoid functions is a tilted bell-shaped function, wherein the stiffs of both sides can be control by parameters as follows:

$$dsigmf(x, [a1\ c1\ a2\ c2]) = \frac{1}{1+e^{-a1(x-c1)}} - \frac{1}{1+e^{-a2(x-c2)}} \quad (4)$$

where x is an element in the motion map; a1 and a2 control the left slope and right slope of the bell shape, respectively, and c1 and c2 control where the stiffs should begin on the left- and right-hand side, respectively. By transforming the dynamic map with the tilted-bell-shaped function, the weight map of the restricted area is obtained. FIG. 7 shows the comparison of the phased outputs from our foreground extraction and the conventional background subtraction. With the same foreground extraction threshold (set as 30), our foreground is clearer, and the noise is sparse and less solid, which demonstrates the advantage of using the restricted area map.

II-III. Regression of the Adaptive Threshold Curve for Vehicles

In this section, an adaptive threshold for vehicles is proposed by regressing the road width computed from the scene. Nevertheless, analyzing vehicles in a camera scene can be a tricky problem because our to-be-detected objects vary in size as the distance varies. Fortunately, vehicles are large objects in the scene. Thus, for simplicity, we assume that there are no other foreground objects that can be wider than vehicles on the side of the road. Because the road can be easily segmented by thresholding the motion map, its width is used as a reference measure for the stationary vehicles. Note that for the more complicated scene or other application, more characteristics could be added to the foreground analysis. We have considered using the area which is a natural, straight forward and reasonable idea. However, in the experiments, we found that some vehicles may be shorter than others, which lead to varying sizes of area at the same position of the road. While the width tends to be more stable if the camera captures near-to-far scene. Other vehicle recognition models could also be integrated into our framework. In our case, because the foreground objects have been narrowed down to the road side or road shoulder, we emphasize the computational cost to implement the proposed idea in real time even at higher frame rates and resolutions.

Figure 8:
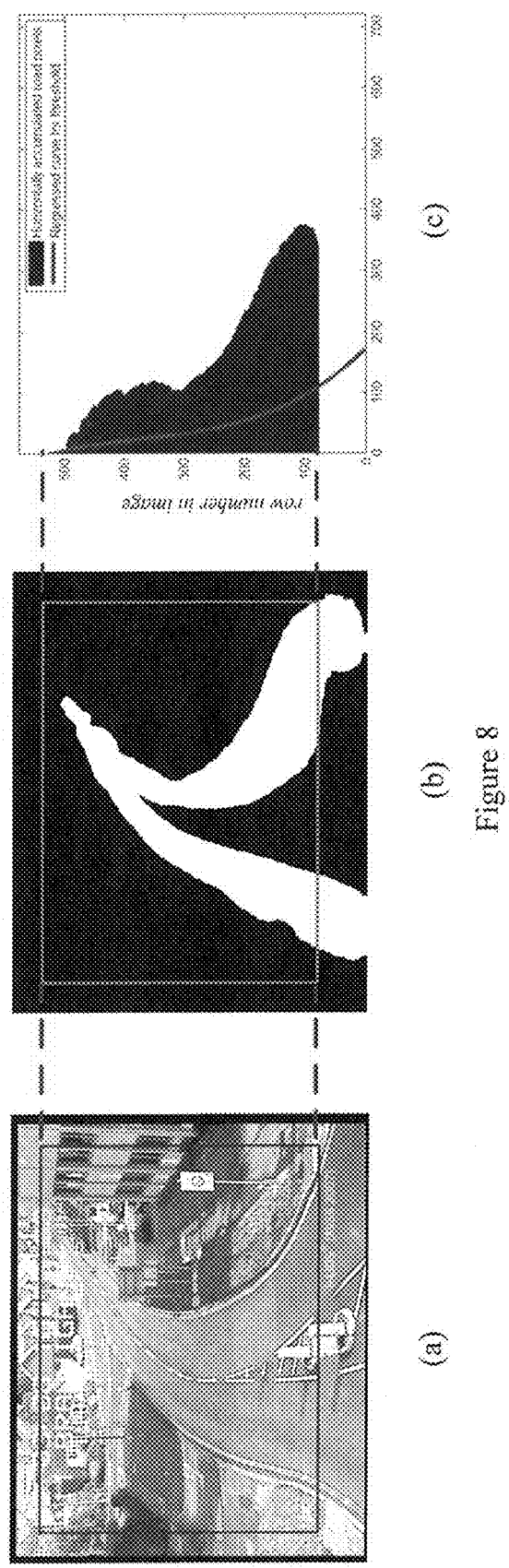
FIG. 8 illustrates a regression of the curve of the adaptive threshold for vehicles: (a) the subframe focuses on the main part of the scene; (b) extracted roads; (c) summarized road and the regressed curve.

FIG. 8 illustrates how a function curve of an adaptive threshold is generated. As the obtained motion map in section II-I, the road can be computed as follows: 1) Normalize the motion map. 2) Threshold the majority of the intensities (the intensities in the interval of [1-0.683,1] are taken as the road). Then, a subframe focusing on the main part of the scene is interactively set by the user to avoid inaccuracies in the marginal area. The subset of the road label is horizontally summarized, therein estimating the width of the road $\overline{wr}$ with respective to the distance of the perspective Y-axis. Using $\overline{wr}$ and after multiplying it by a coefficient $\mu$, we fit a curve of a 3-degree polynomial function $f(y,\overline{p})$ to obtain the adaptive threshold of the stationary vehicle width, where y is the vertical coordinate and $\overline{p}=[p_0, p_1, p_2, p_3]^T$ denotes the coefficients of the regressed polynomial function. Using least squares, the analytic solution is determined as $$\overline{p}=(Y^TY)^{-1}Y^T\overline{wr} \quad (5)$$

where
$Y_{ij}=y^j$, $1 \leq y \leq p1$, $0 \leq j \leq 3$.

III. Experimental Results

Figure 9:
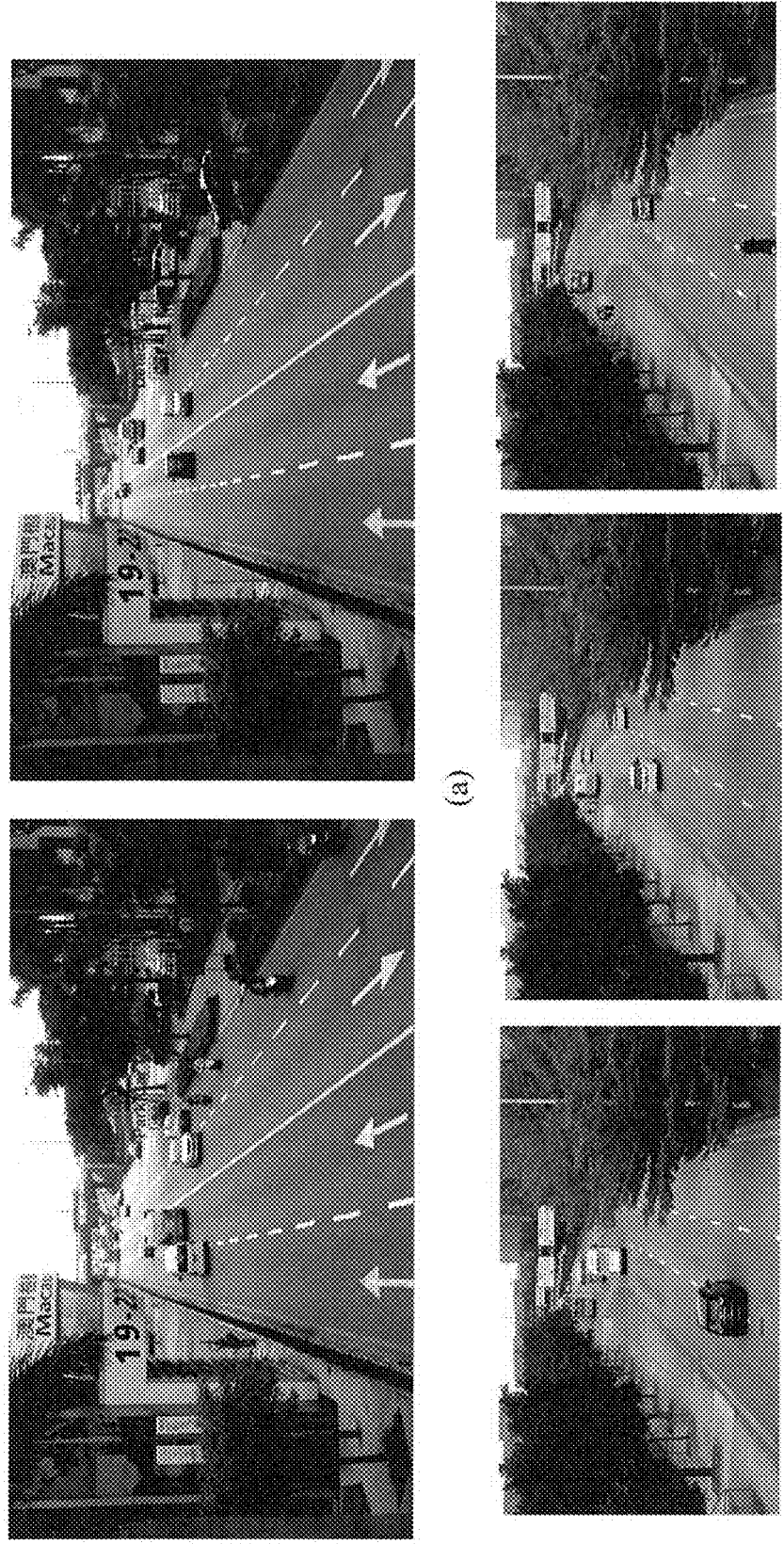
FIG. 9 illustrates (a) two different taxis of the same color pattern are detected as parking in a stoppable area; (b) three different buses are detected when they stop at a bus station.

The proposed system is first tested for its feasibility on a dataset generated by the authors on local foot bridges using conventional cameras. The dataset contains 5 high-definition video clips (HD1280*720 pixels), two of which concern taxis parking on the road side, and the other three concern buses stopped at a station. The criterion for a parked vehicle is that the vehicle has stopped and remained steady for 5 seconds. Snapshots of the qualitative results are shown in FIG. 9, where detections are marked by a bounding box and a brief notification text. We reason that the most suitable data for the proposed method are parked vehicles on the road shoulder of a freeway. This is not merely because of its important application because there is high probability of an emergency when a vehicle is parking on a freeway shoulder. However, technically, this is because freeways exhibit more regular traffic trends and include straight roads with few trees and no pedestrians around the road, which could affect the computed motion information. To fairly evaluate the proposed method, we further test the proposed method on the AVSS iLids PV daylight dataset (http://www.eecs.qmul.ac.uk/~andrea/avss2007_d.html), which detects illegal parking, and compared our results to other state-of-the-art methods. The AVSS iLids PV daylight dataset consists of video clips characterized by different difficulties, ranked as easy, medium and hard. There are approximately 14,000 frames in total, and all video clips are encoded at 25 fps. The criterion for temporarily stopping a vehicle is 1 minute, which is 1500 frames. Parked vehicles stopped on the side for longer than 1500 frames will be considered as illegally parked, and the detector should issue a notification.

The same parameter setting is applied to both test datasets, except for the criteria concerning parking time. Because the camera angle and illumination are slightly different in the testing video clips, we independently initialize the background for each video clip using approximately 500 frames. For each video clip, we randomly pick approximately 1000 frames, with an interval of 5 in a continuous segment with normal traffic and without parked vehicles for initialization of the restricted map. To compute the motion information, assuming that other techniques may be equally functional, we use the Large Displacement Optical Flow (Brox et al.), which effectively addresses blob-like objects compared to conventional methods (Liu et al.). The stable Mean Shift method (Cheng) is used as the clustering method for the motion. The parameters of these tools are set as default values. We set all other parameters as constants throughout all experiments. The threshold for foreground extraction is 30. The parameters [a1 c1 a2 c2] of the difference of sigmoid function are set as [0.2 10 1 80]. The proportion coefficient $\mu$ is $\frac{1}{10}$, which is sufficiently large to avoid stopped pedestrians and sufficiently sensitive to avoid partial occlusion on vehicles.

Figure 10:
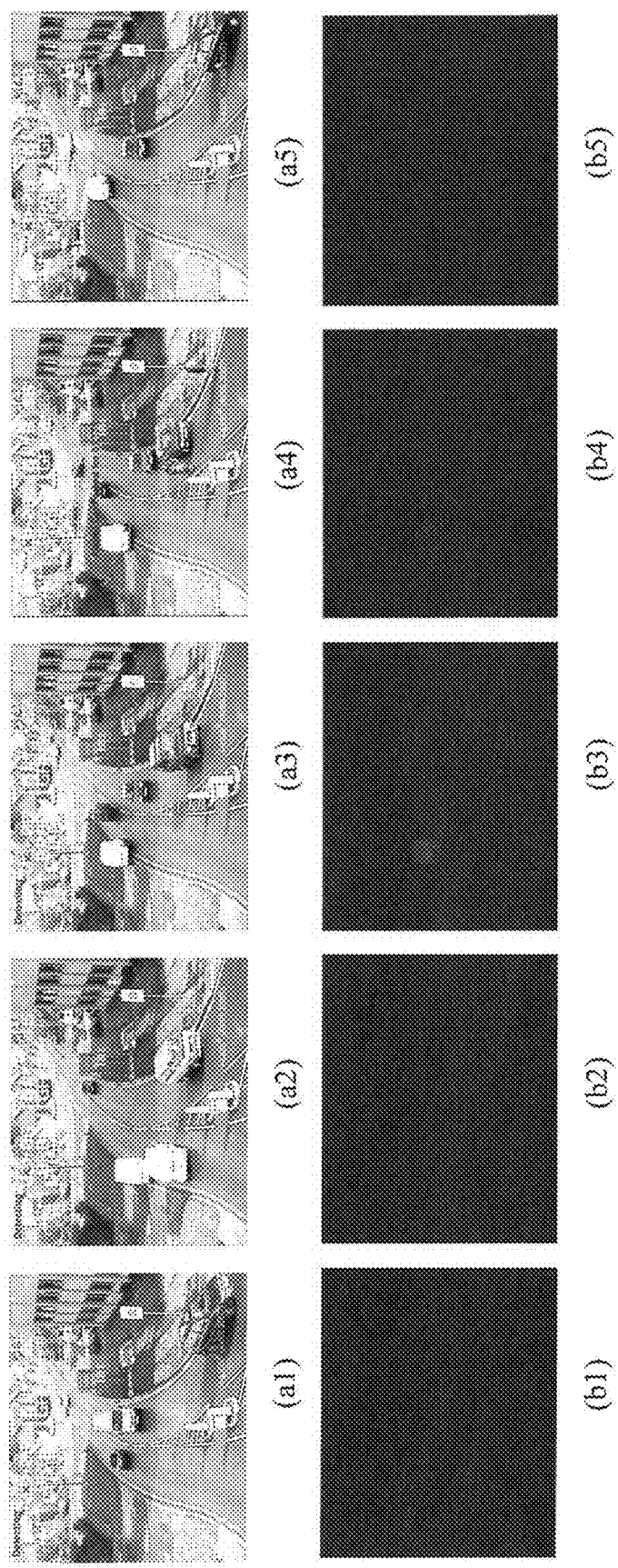
FIG. 10 illustrates qualitative results of the easy clip from AVSS2007 dataset.
Figure 11:
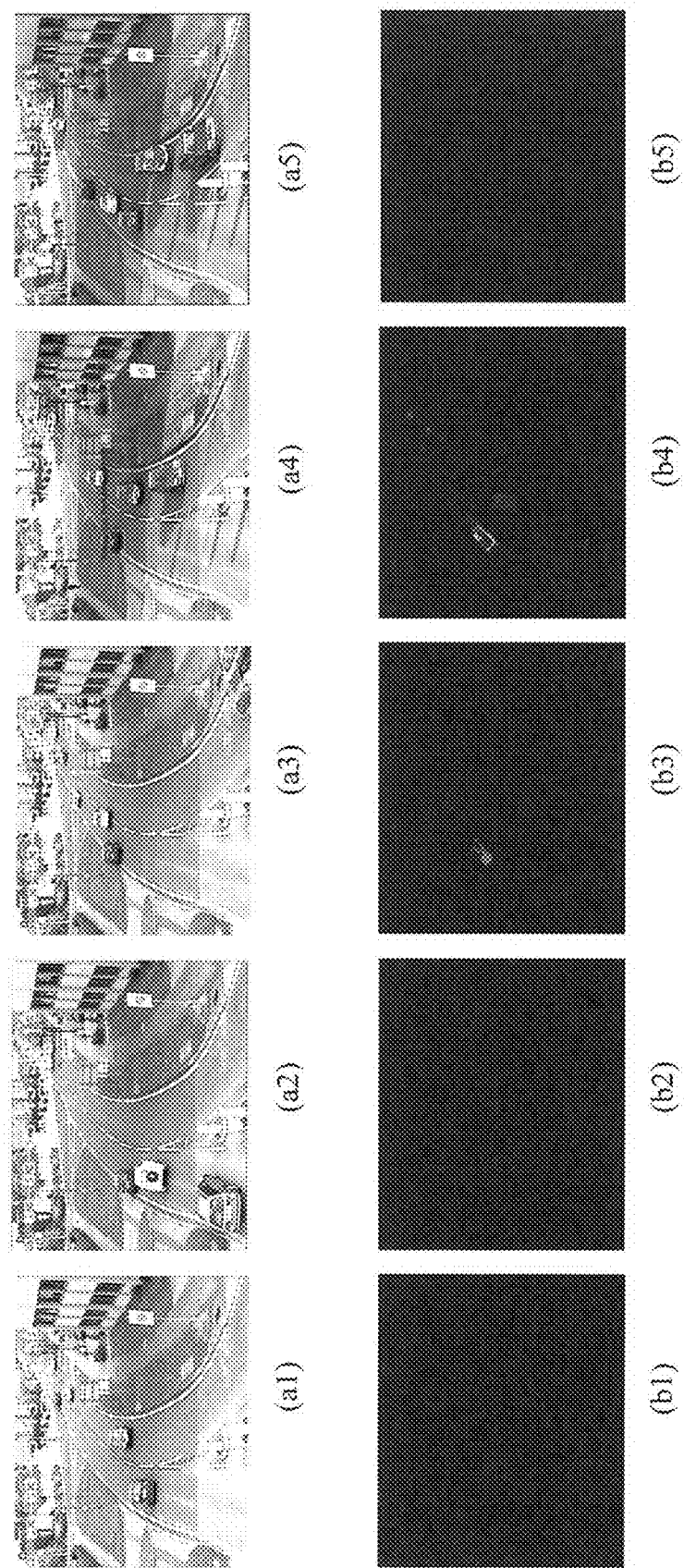
FIG. 11 illustrates qualitative results of the medium clip from AVSS2007 dataset.
Figure 12:
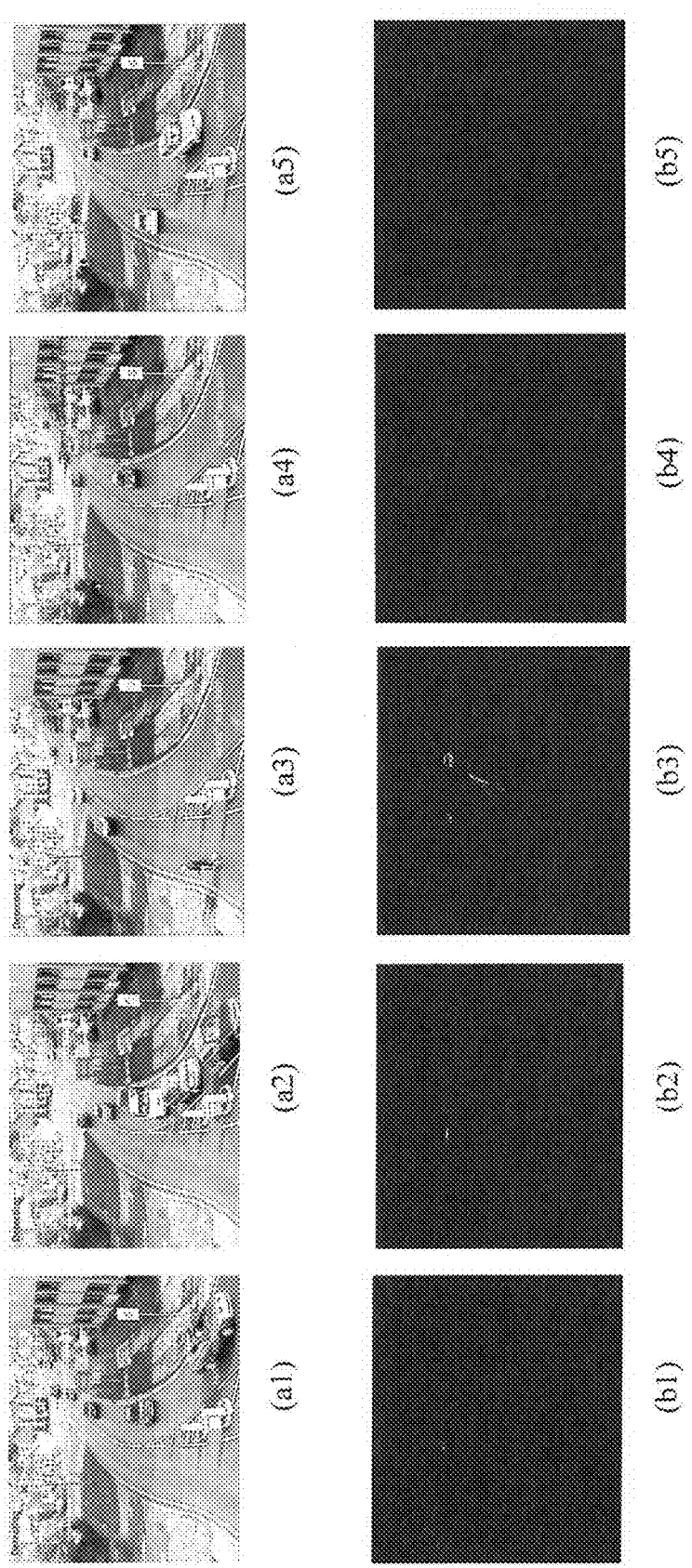
FIG. 12 illustrates qualitative results of the hard clip from AVSS2007 dataset.

The tests were conducted on a PC with an Intel CPU and 12 GB of RAM. All code was implemented in Matlab for convenience. The initialization stage requires substantially more time than does the detection stage. This stage requires approximately 10 minutes to compute the scene background and 2-5 hours to compute the map of the restricted area. Despite the high cost for obtaining the map of the restricted area, it can be continuously reused if the camera is always fixed to capture the same scene. Fortunately, the detection easily achieves real-time performance. The processing speed is recorded at 38.9 frames per second during detection, which is faster than real time (25 fps). This is partly due to the much simpler detection stage, and most of the computation work has been conducted during initialization. If the code were implemented in C++, the processing speed would be much higher and might enable the use of full high-definition videos (FHD1080p). Some qualitative results are presented in FIGS. 10-12. In FIG. 10, a1)-a5) are the detection results for a parked vehicle located by a bounding box. b1)-b5) are the corresponding stationary matrix for a1-a5. The colors blue to red represent the foreground objects being stationary for longer periods of time. a1) and b1) show the normal activity of the captured scene. a2) and b2) show a white car in the middle area preparing to park. a3) shows the white car stopping for a period of time, and the detector is collecting information for the stationary matrix. A segment in a lighter color appears in b3). a4) and b4) show that the time for being stationary has reached the pre-set limit; meanwhile, the foreground analysis is conducted on the segment in the stationary matrix. The adaptive threshold is drawn and compared. The alarm is triggered by the detector, which has located the parked vehicle with a bounding box. a5) and b5) show that the white car has restarted and moved, and the corresponding segment in the stationary matrix is reset to zeros because the corresponding values once again become false in the foreground matrix. Detection is also successful on the Hard clip, as shown in FIG. 12, given a substantially smaller and partially occluded target. During the period 00:40 to 01:15 of the Hard clip, there is a temporary traffic jam, and some vehicles have stopped on the road. Because the weights of the road in the restricted map are zeros, the traffic jam has little influence on the foreground mask and subsequently the stationary matrix. The overall performance is satisfactory. Quantitative results and a comparison are shown in Table 1. Compared to other methods, our method exhibits significantly reduced errors.

TABLE 1

Comparison of quantitative results.

|  | Easy | | | Medium | | | Hard | | | All |
| --- | --- | --- | --- | --- | --- | --- | --- | --- | --- | --- |
|  | Start | End | Abs. Err. | Stall | End | Abs. Err. | Start | End | Abs. Error | Total Err. |
| Ground Truth | 02:48 | 03:15 | — | 01:28 | 01:47 | — | 02:12 | 02:33 | — | — |
| Taek et al [12] | 02:52 | 03:19 | 8 s | 01:41 | 01:55 | 11 s | 02:08 | 02:37 | 8 s | 27 s |
| Boragno et al [13] | 02:48 | 03:19 | 4 s | 01:28 | 01:55 | 8 s | 02:12 | 02:36 | 3 s | 15 s |
| Venetianer et al [14] | 02:52 | 03:16 | 5 s | 01:43 | 01:47 | 5 s | 02:19 | 02:34 | 6 s | 16 s |
| Guler et al [15] | 02:46 | 03:18 | 5 s | 01:28 | 01:54 | 7 s | 02:13 | 02:36 | 4 s | 16 s |
| Lee et al [35] | 02:51 | 03:18 | 6 s | 01:33 | 01:52 | 10 s | 02:16 | 02:34 | 5 s | 21 s |
| Ours | 02:48 | 03:19 | 4 s | 01:31 | 01:50 | 5 s | 02:12 | 02:35 | 2 s | 11 s |

IV. Conclusion

In the specification of the present invention, a real-time detection system using hybrid background modeling is proposed for detecting parked vehicles along the side of a road. The hybrid background model consists of three components: 1) a scene background model, 2) a computed restricted area map, and 3) a dynamic threshold curve for vehicles. By exploiting the motion information of normal activity in the scene, the user could determine the location of the road and how large the vehicles are, and further estimate the roadside and the adaptive threshold of the vehicle size. Compared to other conventional parked vehicle detectors, the proposed system can automatically generate the road and the restricted area along it. After the weight map of the restricted area is obtained, the system applied it to the background subtraction process and generated a substantially clearer foreground mask that is capable of automatically ruling out unrelated foreground objects. Moreover, during initialization, the vehicle size is regressed onto a function curve that outputs adaptive thresholds for a vehicle with respect to the Y-axis. The system triggers a notification when a large vehicle-like foreground object has been stationary for more than a pre-set number of video frames (or time). The proposed method is tested on the AVSS 2007 dataset. The results are satisfactory compared to other state-of-the-art methods.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An offline hybrid background modeling system for online detection, comprising:
   a processor;
   a memory device communicatively coupled with the processor; and
   a non-transitory storage medium including an application configured for execution by the processor that when executed, enables the processor to:
   load initialization frames from the memory device or the non-transitory storage medium acquired by a camera and stack each frame into a 1-D sample vector, wherein the initialization frames contain traffic activities;
   form an observation matrix by using sample vectors and set a balancing coefficient;
   solve a low-rank representation and output a low-rank matrix to the memory device;
   calculate a row-wise median values based on an estimated low-rank matrix and reshape it into the matrix; and
   obtain a scene background image based on the matrix.

2. The system according to claim 1, wherein the general form of the low-rank representation is $$\min_{L,E}(\|L\|_* + \lambda\|E\|_0)$$
$$\text{s.t. } X = L + E,$$

wherein L is the-rank matrix, E is a sparse matrix, and λ is the balancing coefficient.

3. The system according to claim 1, wherein the balancing coefficient λ is set to 0.1.

4. The system according to claim 1, wherein the processor solved the low-rank representation by using augmented Lagrange multiplier method.

5. A real-time detection system for parked vehicles, comprising:
   a processor;
   a memory device communicatively coupled with the processor; and
   a non-transitory storage medium including an application configured for execution by the processor that when executed, enables the processor to:
   set a stationary matrix $S_0=0$ and receive a number of frames entered by a user and temporarily stored in the memory device;
   perform a background subtraction on frame i acquired by a camera and calculate foreground object labels by using a precalculated restricted area map, wherein i is a natural number;
   update a stationary matrix $S_i$ for obtaining $\overline{S}_i$ by thresholding a stationary criteria;

extract connected components from $S_i$ as candidates, and calculate centroids and average widths of the candidates;

calculate adaptive thresholds using y coordinates of the candidates' centroids and an adaptive threshold function; and send a notification to output user devices if the average width of the candidate is larger than the adaptive threshold.

6. The system according to claim 5, wherein the stationary matrix is two dimensional.

7. The system according to claim 5, wherein the processor precalculated the restricted area by following steps:

loading initialization frames from the memory device or the non-transitory storage device medium acquired by the camera and computing motion information of every two consecutive frames, wherein the initialization frames contain traffic activities;

performing mean shift clustering on motion information matrices, extracting moving objects and outputting foreground moving object masks;

accumulating the motion matrices and outputting a motion map;

transforming the motion map by using difference of sigmoid functions; and obtaining the restricted area based on the transformed motion map.

8. The system according to claim 7, wherein the difference of sigmoid functions is $$dsigmf(x, [a1\ c1\ a2\ c2]) = \frac{1}{1+e^{-a1(x-c1)}} - \frac{1}{1+e^{-a2(x-c2)}},$$

wherein x is an element in the motion map; a1 and a2 control the left slope and right slope of the bell shape, respectively, and c1 and c2 control where the stiffs should begin on the left- and right-hand side, respectively.

9. The system according to claim 7, wherein the adaptive threshold function is calculated by polynomial regression using the motion map obtained in claim 7.

* * * * *